(12) United States Patent
Rezk (10) Patent No.: US 11,243,298 B2
(45) Date of Patent: *Feb. 8, 2022

(54) COMBINING HIGH POWER PATH OPTICAL BEAMS INTO A SINGLE SPATIAL MODE OPTICAL BEAM

(71) Applicant: Aeva, Inc., Mountain View, CA (US)

(72) Inventor: Mina Rezk, Haymarket, VA (US)

(73) Assignee: Aeva, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/334,515

(22) Filed: May 28, 2021

(65) Prior Publication Data

US 2021/0286057 A1     Sep. 16, 2021

Related U.S. Application Data

(63) Continuation of application No. 16/354,694, filed on Mar. 15, 2019, now Pat. No. 11,022,683.

(60) Provisional application No. 62/643,414, filed on Mar. 15, 2018.

(51) Int. Cl.
| | |
|---|---|
| *G01C 3/08* | (2006.01) |
| *G01S 7/499* | (2006.01) |
| *G01S 17/58* | (2006.01) |
| *G02B 27/28* | (2006.01) |
| *G01S 17/26* | (2020.01) |

(52) U.S. Cl.
CPC .............. *G01S 7/499* (2013.01); *G01S 17/26* (2020.01); *G01S 17/58* (2013.01); *G02B 27/283* (2013.01)

(58) Field of Classification Search
CPC .......... G01S 7/499; G01S 17/26; G01S 17/58; G02B 27/283
USPC ........................................................ 356/4.01
See application file for complete search history.

(56) References Cited

U.S. PATENT DOCUMENTS

| | | | |
|---|---|---|---|
| 2006/0182383 A1* | 8/2006 | Slotwinski | G01S 7/4818 385/12 |
| 2016/0377721 A1 | 12/2016 | Lardin et al. | |
| 2017/0242100 A1 | 8/2017 | Hinokuma et al. | |
| 2020/0225332 A1* | 7/2020 | Wagner | G01S 13/003 |

FOREIGN PATENT DOCUMENTS

| | | | | |
|---|---|---|---|---|
| CN | 106932785 A | * | 7/2017 | ............ G01S 17/95 |
| JP | 2013160717 A | | 8/2013 | |

* cited by examiner

*Primary Examiner* — Mark Hellner
(74) *Attorney, Agent, or Firm* — Womble Bond Dickinson (US) LLP (57) ABSTRACT

A light detection and ranging system includes a first optical source and a second optical source configured to emit respectively a first optical beam and a second optical beam that have opposite polarizations. The system also includes a first tap and a second tap configured to split respectively the first optical beam and the second optical beam into a first high-power path optical beam and a first low-power path optical beam, and a second high-power path optical beam and a second low-power path optical beam. The system also includes a first polarization beam splitter configured to combine the first high-power path optical beam and the second high-power path optical beam into a single spatial mode optical beam.

19 Claims, 9 Drawing Sheets

COMBINING HIGH POWER PATH OPTICAL BEAMS INTO A SINGLE SPATIAL MODE OPTICAL BEAM

CROSS-REFERENCE TO RELATED APPLICATION(S)

This application is a continuation of U.S. patent application Ser. No. 16/354,694, filed Mar. 15, 2019, which claims priority to U.S. Provisional Patent Application No. 62/643,414, filed Mar. 15, 2018, the contents of which are incorporated herein by reference in their entirety.

TECHNOLOGICAL FIELD

The present disclosure relates generally to traditional light detection and ranging (LiDAR) and, in particular, to LiDAR that provides simultaneous measurement of range and velocity across two dimensions.

BACKGROUND

Typical LiDAR systems are pulsed based (or direct detection) and they simply cannot measure the range and velocity of the object simultaneously. Example implementations of the present disclosure are based on a different kind of LiDAR system which is frequency modulated (FM). Typical FM LiDAR systems are bulky and large and suffer from significant losses in the receive path. This leads into more power output which is limited by eye safety or shorter ranges.

BRIEF SUMMARY

The present disclosure includes, without limitation, the following example implementations.

Some example implementations provide a light detection and ranging (LiDAR) system comprising: a first optical source and a second optical source configured to emit respectively a first optical beam and a second optical beam that have opposite polarizations; a first tap and a second tap configured to split respectively the first optical beam and the second optical beam into a first high-power path optical beam and a first low-power path optical beam, and a second high-power path optical beam and a second low-power path optical beam; a first polarization beam splitter configured to combine the first high-power path optical beam and the second high-power path optical beam into a single spatial mode optical beam; and at least one optical arrangement for at least one target, each optical arrangement including: lensing optics configured to launch the single spatial mode optical beam towards the target, and collect light incident upon the target into a return path, the light being collected into a return optical beam; a second polarization beam splitter configured to split the return optical beam into a first spatial mode optical beam and a second spatial mode optical beam; a first mixer configured to mix the first spatial mode optical beam and the first low-power path optical beam to produce an optical beam having a first beat frequency, and a second mixer configured to mix the second spatial mode optical beam and the second low-power path optical beam to produce an optical beam having a second beat frequency; and a first optical detector and a second optical detector configured to detect respectively the optical beam having the first beat frequency and the optical beam having the second beat frequency, a range and velocity of the target being determinable from the first beat frequency and the second beat frequency.

In some example implementations of the LiDAR system of any preceding example implementation, or any combination of preceding example implementations, the first optical detector and the second optical detector are each a balanced optical detector.

In some example implementations of the LiDAR system of any preceding example implementation, or any combination of preceding example implementations, the LiDAR system further comprises an optical amplifier between the first polarization beam splitter and lensing optics, the optical amplifier configured to amplify the single spatial mode optical beam.

In some example implementations of the LiDAR system of any preceding example implementation, or any combination of preceding example implementations, the optical arrangement further includes at least one optical device configured to route the single spatial mode optical beam from the first polarization beam splitter to the lensing optics, and route the return optical beam from the lensing optics to the second polarization beam splitter.

In some example implementations of the LiDAR system of any preceding example implementation, or any combination of preceding example implementations, the optical arrangement includes a polarization wave plate configured to convert polarization of the return optical beam compared to the single spatial mode optical beam.

In some example implementations of the LiDAR system of any preceding example implementation, or any combination of preceding example implementations, the lensing optics include distinct first and second lensing optics configured to respectively launch the single spatial mode optical beam towards the target, and collect the light incident upon the target into the return path, the light being collected into the return optical beam.

In some example implementations of the LiDAR system of any preceding example implementation, or any combination of preceding example implementations, the LiDAR system further comprises: a third tap between the first polarization beam splitter and the at least one optical arrangement, the third tap configured to split the single spatial mode optical beam into the single spatial mode optical beam and another single spatial mode optical beam; and a local reference interferometer configured to receive the other single spatial mode optical beam, the local reference interferometer including: an optical splitter configured to split the other respective single spatial mode optical beam into a first part optical beam and a second part optical beam for propagation along respectively a first path and a second path, the first path having a propagation medium to give the first path a greater length than the second path; an optical combiner configured to combine the first part optical beam and the second part optical beam from the first path and the second path into a reference optical beam; and a third polarization beam splitter configured to split the reference optical beam into a first reference optical beam and a second reference optical beam.

In some example implementations of the LiDAR system of any preceding example implementation, or any combination of preceding example implementations, the LiDAR system is implemented with a circuit that is compatible with current photonic integrated circuits.

Some example implementations provide a light detection and ranging (LiDAR) system comprising: a first optical source and a second optical source configured to emit respectively a first optical beam and a second optical beam that have opposite polarizations; a first tap and a second tap configured to split respectively the first optical beam and the second optical beam into a first high-power path optical beam and a first low-power path optical beam, and a second high-power path optical beam and a second low-power path optical beam; a first optical splitter and a second optical splitter configured to split respectively the first low-power path optical beam into multiple first low-power path optical beams, and the second low-power path optical beam into multiple second low-power path optical beams; a first polarization beam splitter configured to combine the first high-power path optical beam and the second high-power path optical beam into a single spatial mode optical beam; a third optical splitter configured to split the single spatial mode optical beam into multiple single spatial mode optical beams; and multiple optical arrangements for multiple targets, each of the multiple optical arrangements including: lensing optics configured to launch a respective single spatial mode optical beam of the multiple single spatial mode optical beams towards a respective target of the multiple targets, and collect light incident upon the respective target into a return path, the light being collected into a return optical beam; a second polarization beam splitter configured to split the return optical beam into a first spatial mode optical beam and a second spatial mode optical beam; a first mixer configured to mix the first spatial mode optical beam and a respective first low-power path optical beam of the multiple first low-power path optical beams to produce an optical beam having a first beat frequency, and a second mixer configured to mix the second spatial mode optical beam and a respective second low-power path optical beam of the multiple second low-power path optical beams to produce an optical beam having a second beat frequency; and a first optical detector and a second optical detector configured to detect respectively the optical beam having the first beat frequency and the optical beam having the second beat frequency, a range and velocity of the respective target being determinable from the first beat frequency and the second beat frequency.

In some example implementations of the LiDAR system of any preceding example implementation, or any combination of preceding example implementations, the first optical detector and the second optical detector are each a balanced optical detector.

In some example implementations of the LiDAR system of any preceding example implementation, or any combination of preceding example implementations, the LiDAR system further comprises an optical amplifier between the first polarization beam splitter and the optical splitter, the optical amplifier configured to amplify the single spatial mode optical beam.

In some example implementations of the LiDAR system of any preceding example implementation, or any combination of preceding example implementations, each of the optical arrangements further includes at least one optical device configured to route the respective single spatial mode optical beam from the optical splitter to the lensing optics, and route the return optical beam from the lensing optics to the second polarization beam splitter.

In some example implementations of the LiDAR system of any preceding example implementation, or any combination of preceding example implementations, the lensing optics include distinct first and second lensing optics configured to respectively launch the respective single spatial mode optical beam towards the target, and collect the light incident upon the target into the return path, the light being collected into the return optical beam.

In some example implementations of the LiDAR system of any preceding example implementation, or any combination of preceding example implementations, the LiDAR system further comprises: a third tap between the first polarization beam splitter and the multiple optical arrangements, the third tap configured to split the single spatial mode optical beam into the single spatial mode optical beam and another single spatial mode optical beam; and a local reference interferometer configured to receive the other single spatial mode optical beam, the local reference interferometer including: a fourth optical splitter configured to split the other respective single spatial mode optical beam into a first part optical beam and a second part optical beam for propagation along respectively a first path and a second path, the first path having a propagation medium to give the first path a greater length than the second path; an optical combiner configured to combine the first part optical beam and the second part optical beam from the first path and the second path into a reference optical beam; and a third polarization beam splitter configured to split the reference optical beam into a first reference optical beam and a second reference optical beam.

Some example implementations provide a method of light detection and ranging, the method comprising: emitting respectively a first optical beam and a second optical beam that have opposite polarizations; splitting respectively the first optical beam and the second optical beam into a first high-power path optical beam and a first low-power path optical beam, and a second high-power path optical beam and a second low-power path optical beam; combining the first high-power path optical beam and the second high-power path optical beam into a single spatial mode optical beam; and launching the single spatial mode optical beam towards the target, and collect light incident upon the target into a return path, the light being collected into a return optical beam; splitting the return optical beam into a first spatial mode optical beam and a second spatial mode optical beam; mixing the first spatial mode optical beam and the first low-power path optical beam to produce an optical beam having a first beat frequency, and mixing the second spatial mode optical beam and the second low-power path optical beam to produce an optical beam having a second beat frequency; and detecting respectively the optical beam having the first beat frequency and the optical beam having the second beat frequency, a range and velocity of the target being determinable from the first beat frequency and the second beat frequency.

In some example implementations of the method of any preceding example implementation, or any combination of preceding example implementations, the optical beam having the first beat frequency and the optical beam having the second beat frequency are detected by respectively a first optical detector and a second optical detector are each a balanced optical detector.

In some example implementations of the method of any preceding example implementation, or any combination of preceding example implementations, the method comprises a first polarization beam splitter combining the first high-power path optical beam and the second high-power path optical beam into the single spatial mode optical beam, and lensing optics launching the single spatial mode optical beam towards the target, and collecting light incident upon the target into a return path, the light being collected into a return optical beam.

In some example implementations of the method of any preceding example implementation, or any combination of preceding example implementations, the method further comprises an optical amplifier, between the first polarization beam splitter and lensing optics, amplifying the single spatial mode optical beam.

In some example implementations of the method of any preceding example implementation, or any combination of preceding example implementations, the method further comprises at least one optical device routing the single spatial mode optical beam from the first polarization beam splitter to the lensing optics, and routing the return optical beam from the lensing optics to the second polarization beam splitter.

In some example implementations of the method of any preceding example implementation, or any combination of preceding example implementations, the lensing optics include distinct first and second lensing optics respectively launching the single spatial mode optical beam towards the target, and collecting the light incident upon the target into the return path, the light being collected into the return optical beam.

In some example implementations of the method of any preceding example implementation, or any combination of preceding example implementations, the method further comprises: splitting the single spatial mode optical beam into the single spatial mode optical beam and another single spatial mode optical beam; and receiving the other single spatial mode optical beam at a local reference interferometer, the local reference interferometer at least: splitting the other respective single spatial mode optical beam into a first part optical beam and a second part optical beam for propagation along respectively a first path and a second path, the first path having a propagation medium to give the first path a greater length than the second path; combining the first part optical beam and the second part optical beam from the first path and the second path into a reference optical beam; and splitting the reference optical beam into a first reference optical beam and a second reference optical beam.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Example implementations of the present disclosure propose a method to measure the range and velocity simultaneously without suffering major losses in the receive path and with a circuit that is compatible with current photonic integrated circuits such as, but not limited to, silicon photonics, silica or programmable logic controller (PLC) processes.

Example implementations of the present disclosure are directed to a method to construct an optical radar that is capable of simultaneous measurement for range and velocity measurement in a compact, mass-manufacturable fashion. Example implementations have application in a number of different contexts, including in sensing contexts such as those in transportation, manufacturing, metrology, medical, security, and the like. For example, in the automotive industry, such a device can assist with spatial awareness for automated driver assist systems, or self-driving vehicles. Additionally, it can help with velocity calibration of a moving vehicle without the need for a separate inertial movement unit (IMU).

Example implementations of the present disclosure are based on FM LiDAR. A typical LiDAR system sends a pulse out and the range to target is measured by calculating the time it takes for the pulse to come back. In FM LiDAR systems, the power of the optical beam is kept constant while the beam is modulated in the frequency domain. A sawtooth modulation is show in FIG. 1.

Figure 1:
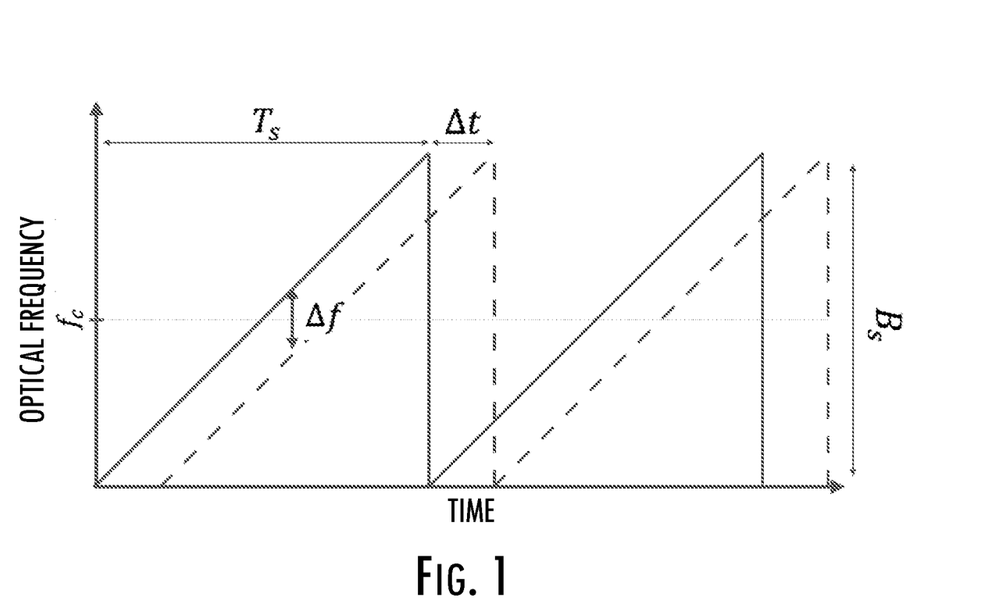
FIGS. 1, 2 and 3 illustrate respectively sawtooth, triangle and counter-chirp modulation schemes for FM LiDAR, according to example implementations of the present disclosure.

The range to target or velocity from the target is then measured by looking at the beat frequency ($\Delta f$) between the outgoing beam and the incoming beam. The beat frequency is then used to estimate the range to the target as follows:

$$\Delta f = \Delta f_{Range} + \Delta f_{Doppler} \qquad (1)$$

$$\text{Range} = \Delta f_{Range} \frac{cT_S}{2B_S} \qquad (2)$$

$$\text{Velocity} = \Delta f_{Doppler} \frac{\lambda_c}{2} \quad (3)$$

where $\lambda_c = c/f_c$, and $\Delta f_{Range}$ and $\Delta f_{Doppler}$ are the range beat and Doppler beat frequencies corresponding to stationary and moving objects, respectively.

The main issue with the above theme is differentiating between the range frequency and Doppler frequency.

Figure 2:
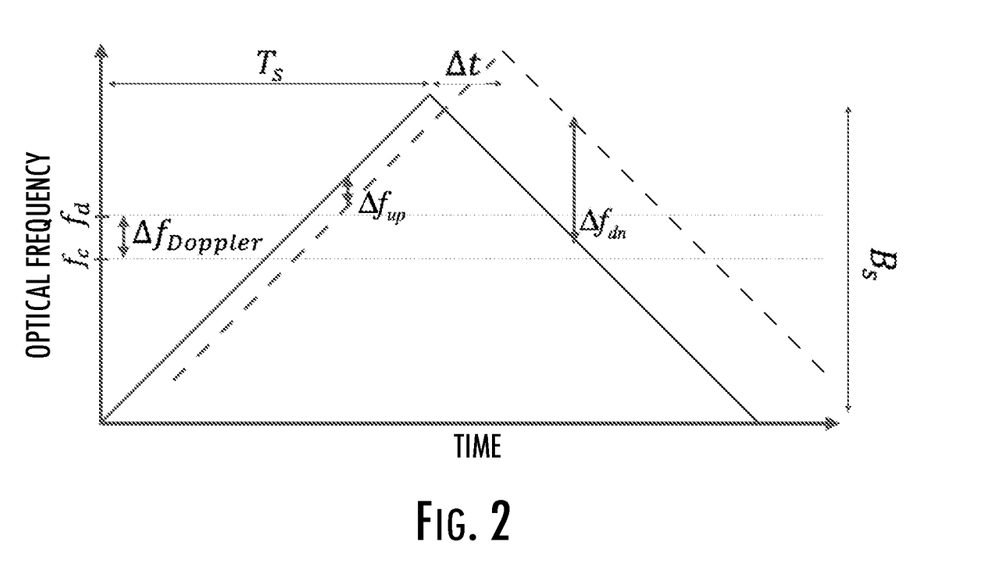

Another method to capture the range and velocity simultaneously is to imply a triangle modulation scheme (shown in FIG. 2). In this scheme there is an upsweep and a down sweep. In the event of the Doppler shift, the upsweep frequency and down sweep frequency would be:

$$\Delta f_{up} = \Delta f_{Range} - \Delta f_{Doppler} \quad (4)$$

$$\Delta f_{dn} = \Delta f_{Range} + \Delta f_{Doppler} \quad (5)$$

In that modulation scheme, the Doppler is simply the difference between the up and down sweep frequency while the Range is the average of the up and down sweep frequency. However, the issue is that the assumption is that the velocity is contact during the up and down sweep. In a dynamic environment this assumption does not hold and a different modulation scheme is needed.

Figure 3:
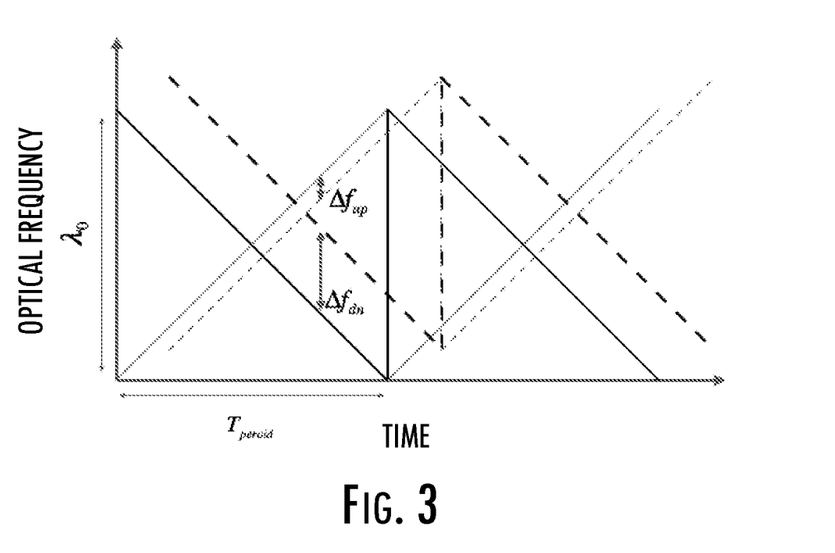

To achieve improved measurements of range and velocity, a counter chirp mechanism is employed (shown in FIG. 3). In this mechanism there are two outgoing beams: one beat note ($\Delta f_{up}$) is measuring range+Doppler and other ($\Delta f_{dn}$) is measuring range−Doppler. Example implementations of the present disclosure provide a method to construct a system capable of achieving 4D measurement at long range using a counter chirp mechanism or similar.

Figure 4:
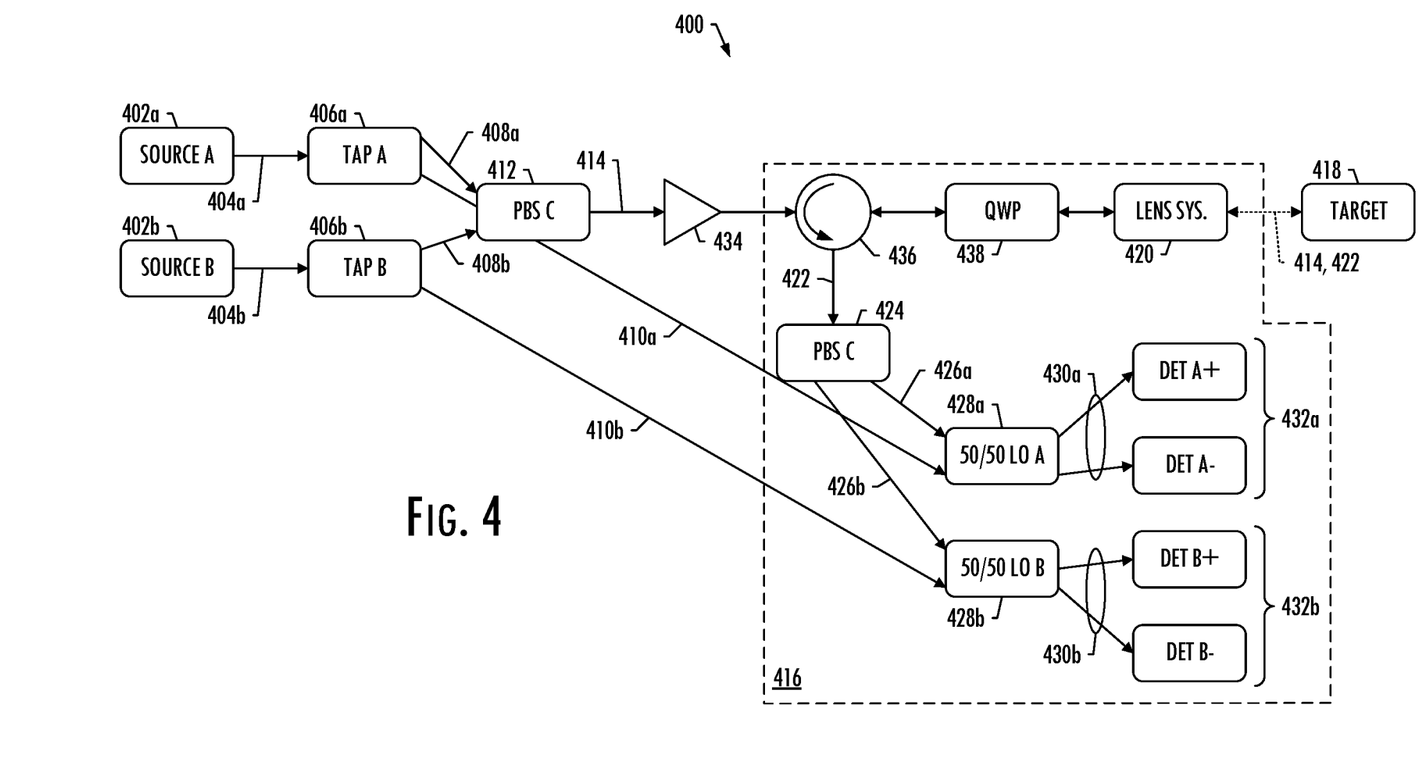
FIG. 4 illustrates a four-dimensional (4D) FM LiDAR system according to example implementations.

One example implementation of the present disclosure is shown in FIG. 4. This example implementation includes two optical beams (Source A and Source B) that are launched in opposite polarizations to the circuit. Suitable examples of optical sources include laser sources, light-emitting diodes (LEDs) and the like. One can mount these optical sources on the same sub-mount or on separate one, and then tune each optical beam with a wave. Each optical beam could be tuned in a counter chirp fashion such as what is shown in FIG. 2. In some examples, more than two optical beams are used. The two or more optical beams may be from the same or separate and distinct optical sources.

Each beam is then split to create each own local oscillator and then both beams are combined into single waveguide using a polarization beam splitter (PBS). This beam can then be amplified using an EDFA or SOA or booster and then launched into the space using a polarization insensitive circulator.

The return path is then returned through the circulator and then goes through the PBS which splits the light into its original orthogonal rotations (representing light from Source A and Source B). Each of these two beams is then mixed with its respective LO to generate the beat signal.

More specifically, then, FIG. 4 illustrates a LiDAR system 400 according to example implementations of the present disclosure. As shown, the LiDAR system includes at least a first optical source 402a and a second optical source 402b (e.g., laser sources, LEDs) configured to emit respectively a first optical beam 404a and a second optical beam 404b that have opposite polarizations. The LiDAR system includes a first tap 406a and a second tap 406b. The first tap is configured to split the first optical beam into a first high-power path optical beam 408a, a first low-power path optical beam 410a, and a first polarization beam splitter 412. The second tap is configured to split the second optical beam into a second high-power path optical beam 408b and a second low-power path optical beam 410b. The first polarization beam splitter is configured to combine the first high-power path optical beam 408a and the second high-power path optical beam 408b into a single spatial mode optical beam 414.

As also shown, the LiDAR system 400 includes at least one optical arrangement 416 for at least one target 418. Each optical arrangement includes lensing optics 420 configured to launch the single spatial mode optical beam 414 towards the target, and collect light incident upon the target into a return path, the light being collected into a return optical beam 422. A second polarization beam splitter 424 is configured to split the return optical beam into a first spatial mode optical beam 426a and a second spatial mode optical beam 426b.

The optical arrangement 416 includes first mixer 428a is configured to mix the first spatial mode optical beam and the first low-power path optical beam 410a to produce an optical beam 430a having a first beat frequency, and a second mixer 428b is configured to mix the second spatial mode optical beam and the second low-power path optical beam 410b to produce an optical beam 430b having a second beat frequency. As shown, a first optical detector 432a and a second optical detector 432b are configured to detect respectively the optical beam having the first beat frequency and the optical beam having the second beat frequency. As explained above, the range and velocity of the target are determinable from the first beat frequency and the second beat frequency.

In some examples, the first optical detector 432a and the second optical detector 432b are each a balanced optical detector. This may reduce any optical power being discarded at the output of the mixers, although single channel detection can also work.

In some examples, the LiDAR system 400 further includes an optical amplifier 434 between the first polarization beam splitter 412 and lensing optics 420, the optical amplifier configured to amplify the single spatial mode optical beam 414. And in some examples, the optical arrangement 416 further includes at least one optical device configured to route the single spatial mode optical beam 414 from the first polarization beam splitter 412 to the lensing optics 420, and route the return optical beam 422 from the lensing optics to the second polarization beam splitter 424. As shown, the optical device(s) include an optical circulator 436 and a polarization wave plate such as a quarter-wave plate (QWP) 438.

Figure 5A:
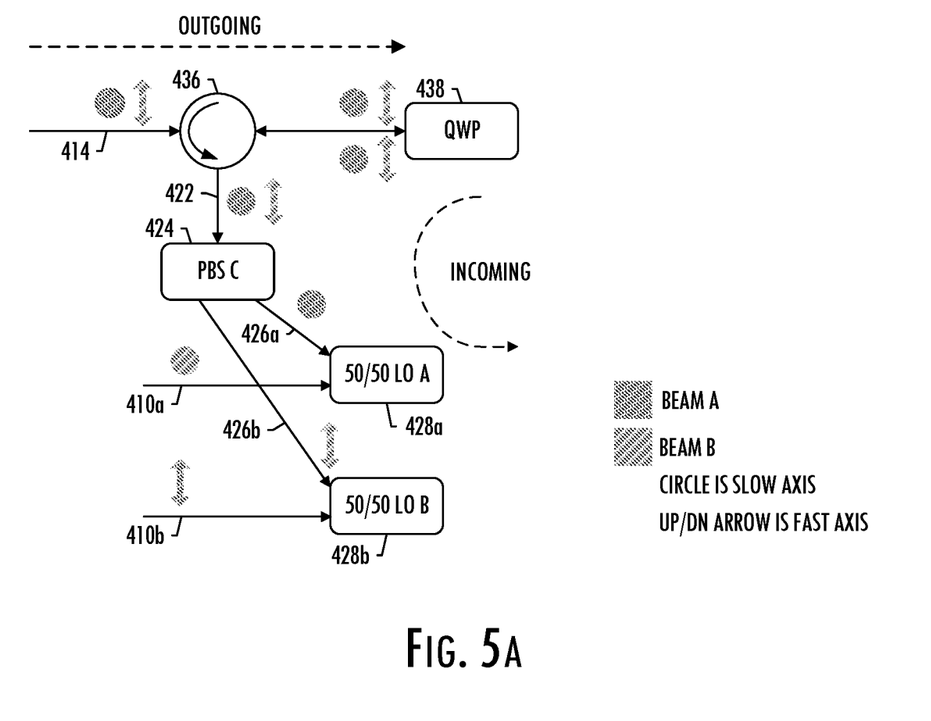
FIGS. 5A and 5B illustrate reducing the fiber tip selection through a quarter-wave plate (QWP) for respectively fiber tip reflection and target reflection, according to example implementations.
Figure 5B:
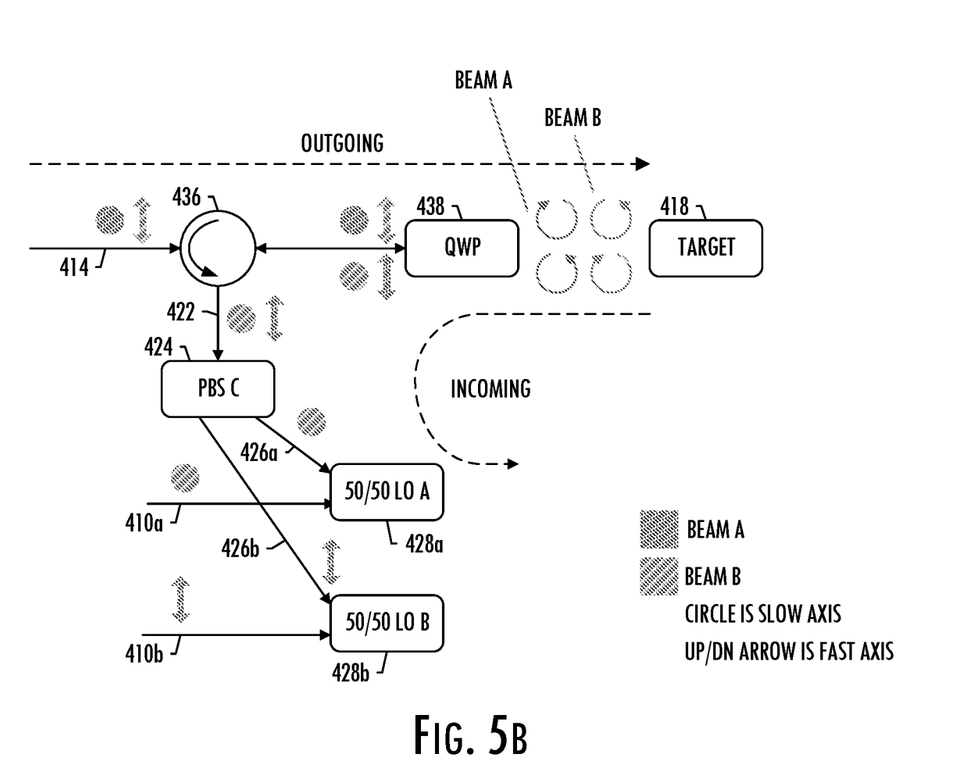

The addition of the optical amplifier 434 in the signal path is to amplify the outgoing beam and therefore increase the signal-to-noise ratio (SNR) at the output. Adding such an amplifier may create a very strong signal at the fiber tip that could act as a strong return signal and increase the noise floor. For that reason, the QWP 438 may be placed after the optical circulator 436, which essentially converts the polarization of the return beam compared to the outgoing beam, as shown in FIGS. 5A and 5B. It converts the slow axis polarization to right-hand circular while the fast axis to left-hand circular. After these counter rotating circular polarizations hit the target 418, it flips it back causing the return beam from the target to arrive at the orthogonal polarization. These target signals are opposite to the fiber tip selection of that polarization. The mixing LO polarization is set to match the target polarization causing the signal from the fiber tip to be much lower.

Figure 6:
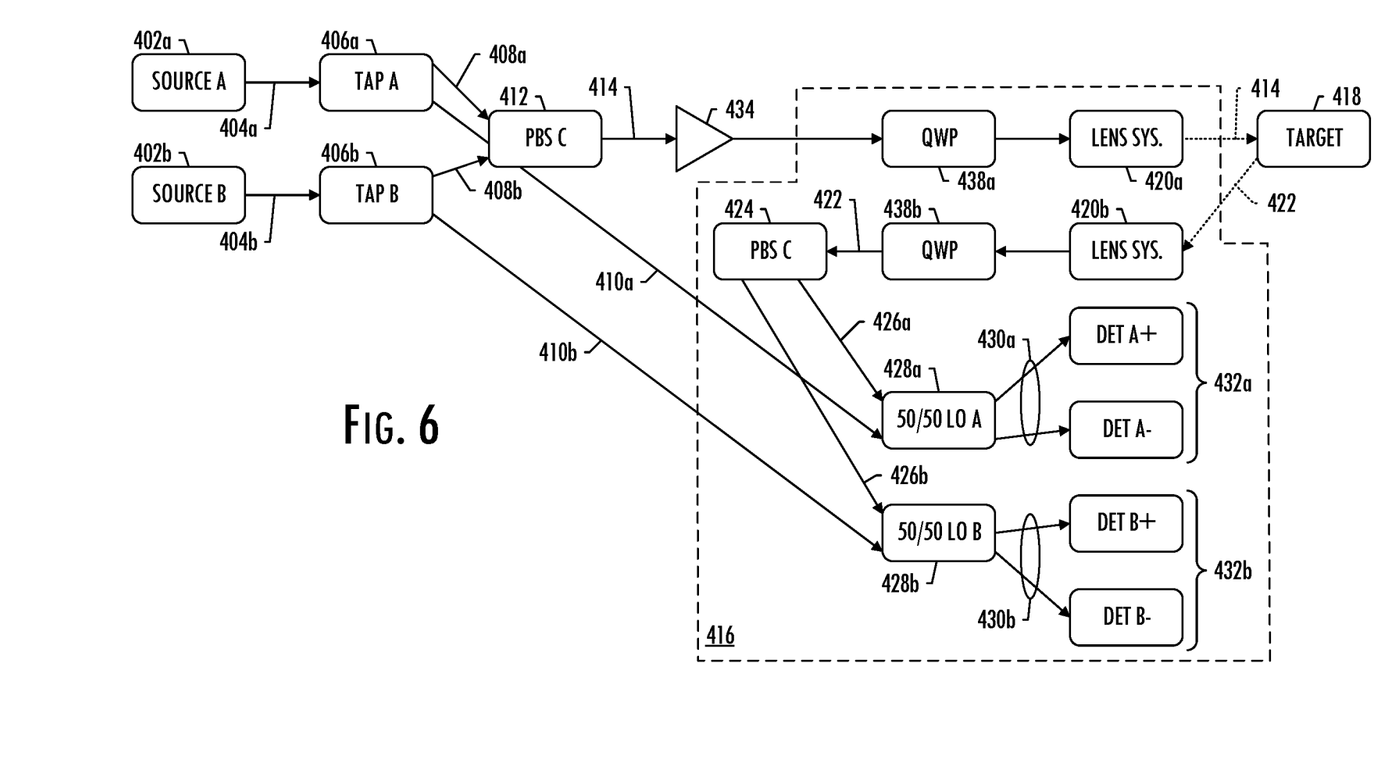
FIG. 6 illustrates a bi-static design of a 4D FM LiDAR system, according to example implementations.

Shown in FIG. 6 is the implementation of a bi-static design for the 4D FM LiDAR system. This implementation decouples the outgoing beam path from the returning collection path. In particular, FIG. 6 illustrates a LiDAR system 600 according to other example implementations of the present disclosure. The LiDAR system 600 shown in FIG. 6 is similar to the LiDAR system 400 shown in FIG. 4. In FIG. 6, though, the lensing optics 420 include distinct first and second lensing optics 420a, 420b. The first lensing optics is configured to respectively launch the single spatial mode optical beam 414 towards the target 418. The second lensing optics is configured to collect the light incident upon the target into the return path, the light being collected into the return optical beam 422. Also in FIG. 6, the optical device(s) include a first QWP 438a configured to route the single spatial mode optical beam 414 from the first polarization beam splitter 412 to the first lensing optics, and a second QWP 438b configured to route the return optical beam 422 from the second lensing optics to the second polarization beam splitter 424.

Figure 7:
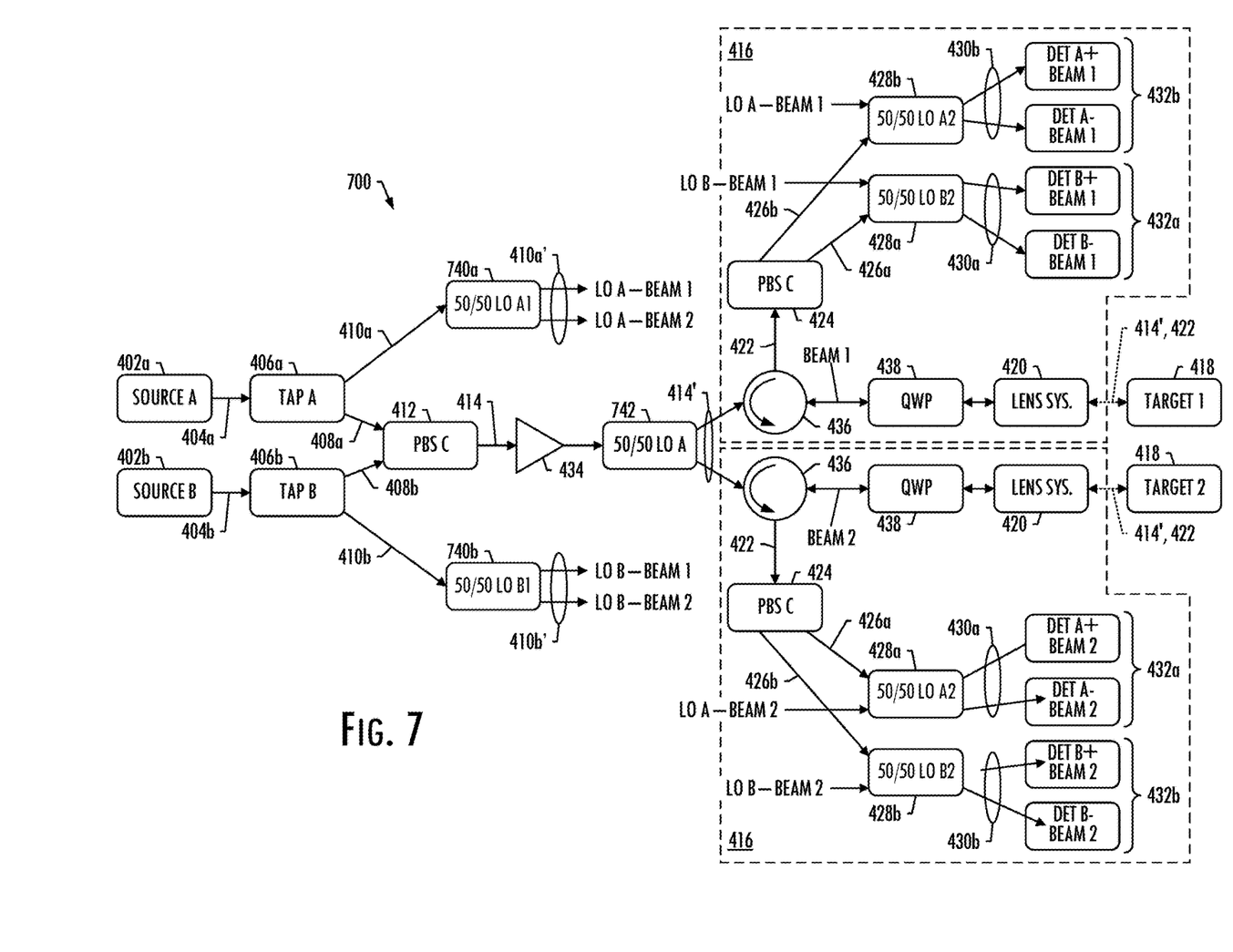
FIG. 7 illustrates a two-beam implementation for a 4D FM LiDAR system, according to example implementations.

An additional method to improve the versatility and usefulness of such a LiDAR system is to illuminate one's surroundings using multiple beams. One way to achieve this is by building many separate systems and synthesizing their data streams. Such a design is cost and resource inefficient from a hardware perspective because every system requires its own optical sources and amplifiers. FIG. 7 shows a schematic of an implementation that uses two outgoing beams in an effort to pool resources.

In particular, FIG. 7 illustrates a LiDAR system 700 according to yet other example implementations of the present disclosure. Similar to before, the LiDAR system includes first and second optical sources 402a, 402b configured to emit respectively first and second optical beams 404a, 404b that have opposite polarizations. The LiDAR system includes a first tap 406a configured to split the first optical beam into a first high-power path optical beam 408a and a first low-power path optical beam 410a. Similarly, a second tap 406b is configured to split the second optical beam into a second high-power path optical beam 408b and a second low-power path optical beam 410b.

The LiDAR system 700 of these example implementations includes a first optical splitter 740a configured to split the first low-power path optical beam 410a into multiple first low-power path optical beams 410a'. A second optical splitter 740b is configured to split the second low-power path optical beam 410b into multiple second low-power path optical beams 410b'. A first polarization beam splitter 412 is configured to combine the first high-power path optical beam 408a and the second high-power path optical beam 408b into a single spatial mode optical beam 414. And a third optical splitter 742 is configured to split the single spatial mode optical beam 414 into multiple single spatial mode optical beams 414'.

As also shown, the LiDAR system 700 includes multiple optical arrangements 416 for multiple targets 418. Similar to before, each of the multiple optical arrangements includes lensing optics 420, a second polarization beam splitter 424, first and second mixers 428a, 428b, and first and second optical detectors 432a, 432b. The lensing optics is configured to launch a respective single spatial mode optical beam 414' of the multiple single spatial mode optical beams towards a respective target of the multiple targets, and collect light incident upon the respective target into a return path, the light being collected into a return optical beam 422.

The second polarization beam splitter 424 is configured to split the return optical beam 422 into a first spatial mode optical beam 426a and a second spatial mode optical beam 426b. The first mixer 428a is configured to mix the first spatial mode optical beam and a respective first low-power path optical beam 410a' of the multiple first low-power path optical beams to produce an optical beam 430a having a first beat frequency. The second mixer 428b is configured to mix the second spatial mode optical beam and a respective second low-power path optical beam 410b' of the multiple second low-power path optical beams to produce an optical beam 430b having a second beat frequency. And the first optical detector 432a and second optical detector 432b are configured to detect respectively the optical beam having the first beat frequency and the optical beam having the second beat frequency, from which a range and velocity of the respective target are determinable.

As also shown, in some examples, the LiDAR system 700 includes an optical amplifier 434 between the first polarization beam splitter 412 and the optical splitter 742, the optical amplifier configured to amplify the single spatial mode optical beam 414. Also, in some examples, each of the optical arrangements 416 further includes at least one optical device (e.g., optical circulator 436, QWP 438) configured to route the respective single spatial mode optical beam 414' from the optical splitter 742 to the lensing optics 420, and route the return optical beam 422 from the lensing optics to the second polarization beam splitter 424.

The above example implementations may assume a single mode or multimode waveguide. Coupling light in such a waveguide may be lossy. Another possible implementation to increase the mode coupling efficiency is to construct the circuit in free space optics.

In some examples, an auxiliary range arm may be added to any of the above implementations to help with the any nonlinear corrections as described in other media. One example is shown in FIG. 8.

Figure 8:
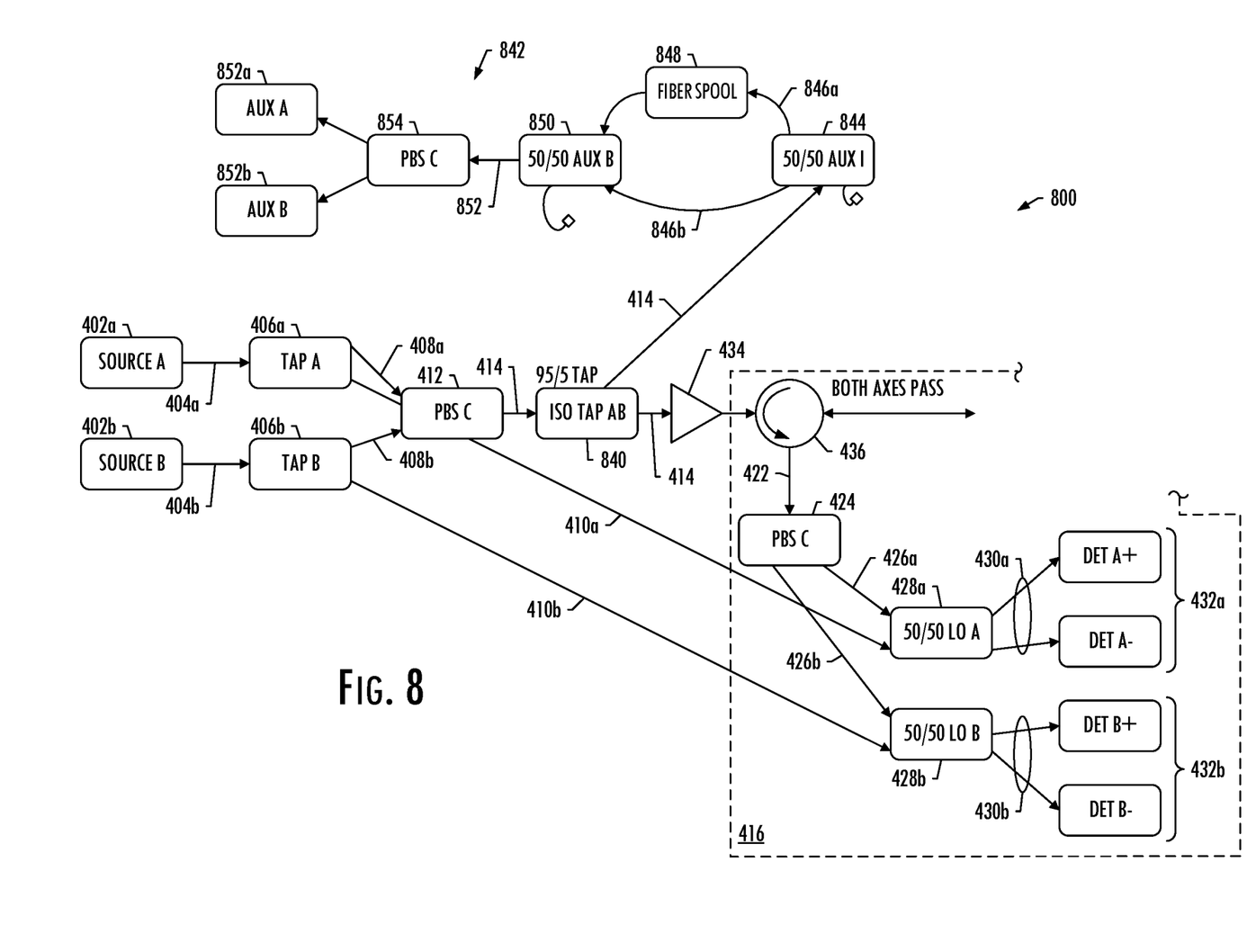
FIG. 8 illustrates a 4D FM LiDAR system with an auxiliary range arm, according to example implementations.

In particular, FIG. 8 illustrates a LiDAR system 800 according to yet other example implementations of the present disclosure. The LiDAR system 800 shown in FIG. 8 is similar to the LiDAR system 400 shown in FIG. 4, but it may be equally configured similar to the LiDAR system 700 shown in FIG. 7. As shown in FIG. 8, the LiDAR system 800 includes a third tap 840 and a local reference interferometer 842. The third tap is located between the first polarization beam splitter 412 and the optical arrangement(s) 416, and configured to split the single spatial mode optical beam 414 into the single spatial mode optical beam and another single spatial mode optical beam. And the local reference interferometer is configured to receive the other single spatial mode optical beam.

The local reference interferometer 416 includes an optical splitter 844 configured to split the other respective single spatial mode optical beam 414 into a first part optical beam 846a and a second part optical beam 846b for propagation along respectively a first path and a second path, with the first path having a propagation medium 848 to give the first path a greater length than the second path. An optical combiner 850 is configured to combine the first part optical beam and the second part optical beam from the first path and the second path into a reference optical beam 852. And third polarization beam splitter 854 is configured to split the reference optical beam 852 into a first reference optical beam 852a and a second reference optical beam 852b.

Another variation of the system is to adjust the center wavelength of the two optical beams to provide different understanding of the target material (e.g., by looking at the difference in the return intensity between the two different wavelengths).

Even further, in some examples, a 2D scanner system may be added at the output of any example implementation to provide a true 4D map.

Figure 9:
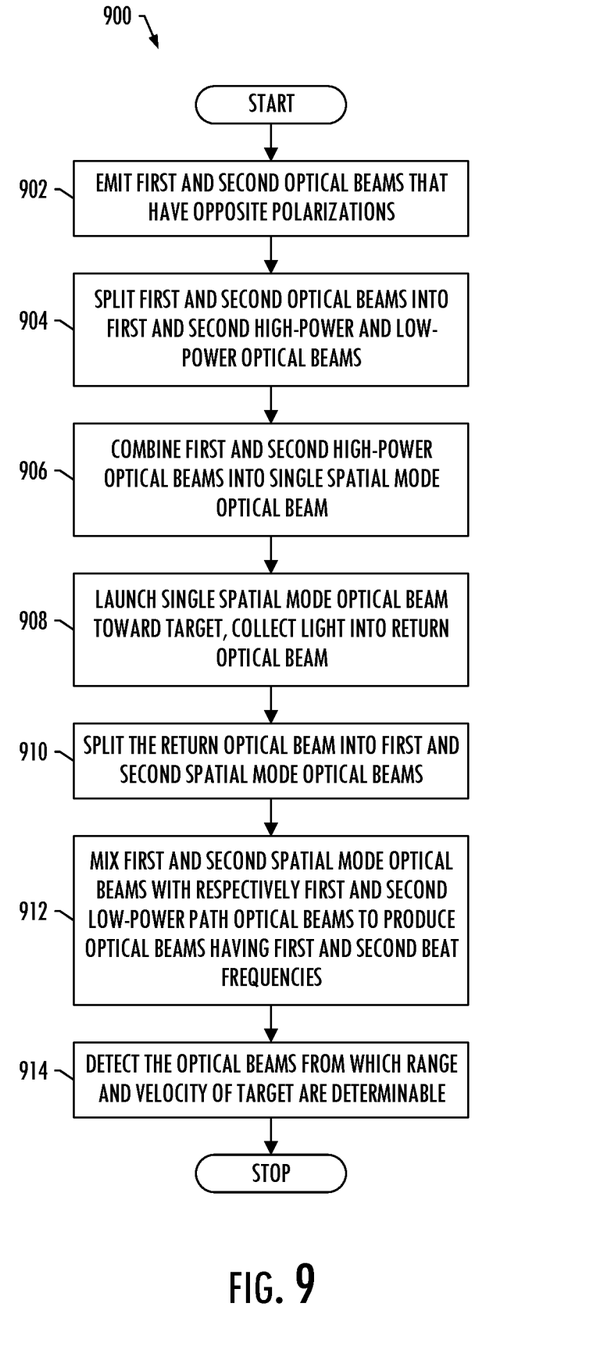
FIG. 9 illustrates a flowchart with various steps in a method of light detection and ranging, according to some example implementations.

FIG. 9 illustrates a flowchart with various steps in a method 900 of light detection and ranging, according to some example implementations of the present disclosure. As shown at block 902, the method includes emitting respectively a first optical beam and a second optical beam that have opposite polarizations. The method includes splitting respectively the first optical beam and the second optical beam into a first high-power path optical beam and a first low-power path optical beam, and a second high-power path optical beam and a second low-power path optical beam, as shown at block 904. The first high-power path optical beam and the second high-power path optical beam are combined into a single spatial mode optical beam, as shown at block 906. And the single spatial mode optical beam is launched towards the target, and light incident upon the target into a return path is collected, the light being collected into a return optical beam, as shown at block 908.

The method 900 includes splitting the return optical beam 422 into a first spatial mode optical beam and a second spatial mode optical beam, as shown at block 910. The method includes mixing the first spatial mode optical beam and the first low-power path optical beam to produce an optical beam having a first beat frequency, and mixing the second spatial mode optical beam and the second low-power path optical beam to produce an optical beam having a second beat frequency, as shown at block 912. The method further includes detecting respectively the optical beam having the first beat frequency and the optical beam having the second beat frequency, as shown at block 914. Again, a range and velocity of the target are determinable from the first beat frequency and the second beat frequency.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A light detection and ranging (LiDAR) system comprising:
    a first optical source and a second optical source configured to emit respectively a first optical beam and a second optical beam that have opposite polarizations;
    a first tap and a second tap configured to split respectively the first optical beam and the second optical beam into a first high-power path optical beam and a first low-power path optical beam, and a second high-power path optical beam and a second low-power path optical beam;
    a first optical splitter and a second optical splitter configured to split respectively the first low-power path optical beam into multiple first low-power path optical beams, and the second low-power path optical beam into multiple second low-power path optical beams; and
    a first polarization beam splitter configured to combine the first high-power path optical beam and the second high-power path optical beam into a single spatial mode optical beam.

2. The LiDAR system of claim 1, further comprising:
    at least one optical arrangement for at least one target, each optical arrangement comprising:
        lensing optics configured to launch the single spatial mode optical beam towards the target, and collect light incident upon the target into a return path, the light being collected into a return optical beam;
        a second polarization beam splitter configured to split the return optical beam into a first spatial mode optical beam and a second spatial mode optical beam;
        a first mixer configured to mix the first spatial mode optical beam and the first low-power path optical beam to produce an optical beam having a first beat frequency, and a second mixer configured to mix the second spatial mode optical beam and the second low-power path optical beam to produce an optical beam having a second beat frequency; and
a first optical detector and a second optical detector configured to detect respectively the optical beam having the first beat frequency and the optical beam having the second beat frequency.

3. The LiDAR system of claim 2, wherein the first optical detector and the second optical detector are each a balanced optical detector.

4. The LiDAR system of claim 2, further comprising an optical amplifier between the first polarization beam splitter and lensing optics, the optical amplifier configured to amplify the single spatial mode optical beam.

5. The LiDAR system of claim 2, wherein the optical arrangement further includes at least one optical device configured to route the single spatial mode optical beam from the first polarization beam splitter to the lensing optics, and route the return optical beam from the lensing optics to the second polarization beam splitter.

6. The LiDAR system of claim 2, wherein the lensing optics include distinct first and second lensing optics configured to respectively launch the single spatial mode optical beam towards the target, and collect the light incident upon the target into the return path, the light being collected into the return optical beam.

7. The LiDAR system of claim 1, wherein the LiDAR system is implemented with a circuit that is compatible with current photonic integrated circuits.

8. The LiDAR system of claim 1, further comprising at least one optical arrangement for respective targets, each optical arrangement comprising components to determine at least one of a range and a velocity of the respective targets.

9. A light detection and ranging (LiDAR) system comprising:
a first optical source and a second optical source configured to emit respectively a first optical beam and a second optical beam that have opposite polarizations;
a first tap and a second tap configured to split respectively the first optical beam and the second optical beam into a first high-power path optical beam and a first low-power path optical beam, and a second high-power path optical beam and a second low-power path optical beam;
a first optical splitter and a second optical splitter configured to split respectively the first low-power path optical beam into multiple first low-power path optical beams, and the second low-power path optical beam into multiple second low-power path optical beams;
a first polarization beam splitter configured to combine the first high-power path optical beam and the second high-power path optical beam into a single spatial mode optical beam; and
a third optical splitter configured to split the single spatial mode optical beam into multiple single spatial mode optical beams.

10. The LiDAR system of claim 9, further comprising:
multiple optical arrangements for multiple targets, each of the multiple optical arrangements including:
lensing optics configured to launch a respective single spatial mode optical beam of the multiple single spatial mode optical beams towards a respective target of the multiple targets, and collect light incident upon the respective target into a return path, the light being collected into a return optical beam;
a second polarization beam splitter configured to split the return optical beam into a first spatial mode optical beam and a second spatial mode optical beam;
a first mixer configured to mix the first spatial mode optical beam and a respective first low-power path optical beam of the multiple first low-power path optical beams to produce an optical beam having a first beat frequency, and a second mixer configured to mix the second spatial mode optical beam and a respective second low-power path optical beam of the multiple second low-power path optical beams to produce an optical beam having a second beat frequency; and
a first optical detector and a second optical detector configured to detect respectively the optical beam having the first beat frequency and the optical beam having the second beat frequency.

11. The LiDAR system of claim 9, further comprising an optical amplifier between the first polarization beam splitter and the optical splitter, the optical amplifier configured to amplify the single spatial mode optical beam.

12. The LiDAR system of claim 10, wherein each of the optical arrangements further includes at least one optical device configured to route the respective single spatial mode optical beam from the optical splitter to the lensing optics, and route the return optical beam from the lensing optics to the second polarization beam splitter.

13. The LiDAR system of claim 10, wherein the lensing optics include distinct first and second lensing optics configured to respectively launch the respective single spatial mode optical beam towards the target, and collect the light incident upon the target into the return path, the light being collected into the return optical beam.

14. The LiDAR system of claim 10, further comprising:
a third tap between the first polarization beam splitter and the multiple optical arrangements, the third tap configured to split the single spatial mode optical beam into the single spatial mode optical beam and another single spatial mode optical beam; and
a local reference interferometer configured to receive the other single spatial mode optical beam, the local reference interferometer including:
a fourth optical splitter configured to split the other respective single spatial mode optical beam into a first part optical beam and a second part optical beam for propagation along respectively a first path and a second path, the first path having a propagation medium to give the first path a greater length than the second path;
an optical combiner configured to combine the first part optical beam and the second part optical beam from the first path and the second path into a reference optical beam; and
a third polarization beam splitter configured to split the reference optical beam into a first reference optical beam and a second reference optical beam.

15. A method of light detection and ranging, the method comprising:
emitting respectively a first optical beam and a second optical beam that have opposite polarizations;
splitting respectively the first optical beam and the second optical beam into a first high-power path optical beam and a first low-power path optical beam, and a second high-power path optical beam and a second low-power path optical beam;

splitting the first low-power path optical beam into multiple first low-power path optical beams using a first optical splitter, and splitting the second low-power path optical beam into multiple second low-power path optical beams using a second optical splitter;

combining the first high-power path optical beam and the second high-power path optical beam into a single spatial mode optical beam; and launching the single spatial mode optical beam towards the target.

16. The method of claim 15, further comprising:

collect lighting incident upon the target into a return path, the light being collected into a return optical beam;

splitting the return optical beam into a first spatial mode optical beam and a second spatial mode optical beam;

mixing the first spatial mode optical beam and the first low-power path optical beam to produce an optical beam having a first beat frequency, and mixing the second spatial mode optical beam and the second low-power path optical beam to produce an optical beam having a second beat frequency; and detecting respectively the optical beam having the first beat frequency and the optical beam having the second beat frequency.

17. The method of claim 15, further comprising amplifying the single spatial mode optical beam prior to the launching.

18. The method of claim 16, further comprising:

splitting the single spatial mode optical beam into the single spatial mode optical beam and another single spatial mode optical beam.

19. The method of claim 18, further comprising:

receiving the other single spatial mode optical beam at a local reference interferometer, the local reference interferometer operating by:

splitting the other respective single spatial mode optical beam into a first part optical beam and a second part optical beam for propagation along respectively a first path and a second path, the first path having a propagation medium to give the first path a greater length than the second path;

combining the first part optical beam and the second part optical beam from the first path and the second path into a reference optical beam; and splitting the reference optical beam into a first reference optical beam and a second reference optical beam.

* * * * *